(12) United States Patent
Nakazawa et al.

(10) Patent No.: US 10,504,652 B2
(45) Date of Patent: Dec. 10, 2019

(54) ELECTRONIC COMPONENT

(71) Applicant: Murata Manufacturing Co., Ltd., Nagaokakyo-shi, Kyoto-fu (JP)

(72) Inventors: Hirotaka Nakazawa, Nagaokakyo (JP); Takashi Sawada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/427,134

(22) Filed: Feb. 8, 2017

(65) Prior Publication Data

US 2017/0229245 A1 Aug. 10, 2017

(30) Foreign Application Priority Data

Feb. 9, 2016 (JP) .................. 2016-022550

(51) Int. Cl.
*H01G 4/30* (2006.01)
*H01G 4/12* (2006.01)
*H01G 4/232* (2006.01)
*H01G 4/012* (2006.01)

(52) U.S. Cl.
CPC ............... *H01G 4/30* (2013.01); *H01G 4/012* (2013.01); *H01G 4/232* (2013.01); *H01G 4/2325* (2013.01); *H01G 4/12* (2013.01)

(58) Field of Classification Search
CPC .......... H01G 4/30; H01G 4/008; H01G 4/012; H01G 4/224; H01G 4/232; H01G 4/236; H01G 4/12
USPC ....................................... 361/301.4
See application file for complete search history.

(56) References Cited

U.S. PATENT DOCUMENTS

2015/0243438 A1* 8/2015 Ahn ................. H01G 4/012
174/258
2016/0049242 A1 2/2016 Sawada et al.

FOREIGN PATENT DOCUMENTS

JP 2000-208361 A 7/2000
JP 2006-100682 A 4/2006
JP 2015-19079 A 1/2015

* cited by examiner

*Primary Examiner* — Michael P McFadden
(74) *Attorney, Agent, or Firm* — Keating & Bennett, LLP

(57) ABSTRACT

An electronic component having excellent reliability includes a first lateral surface and two external electrodes on an outermost side in a length direction among three or more external electrodes on the first lateral surface that are thicker than the other external electrode. On a second lateral surface, two external electrodes that are located on the outermost side in the length direction among three or more external electrodes disposed on the second lateral surface are thicker than the other external electrode.

21 Claims, 10 Drawing Sheets

ELECTRONIC COMPONENT

CROSS REFERENCE TO RELATED APPLICATIONS

This application claims the benefit of priority to Japanese Patent Application No. 2016-022550 filed on Feb. 9, 2016. The entire contents of this application are hereby incorporated herein by reference.

BACKGROUND OF THE INVENTION

1. Field of the Invention

The present invention relates to an electronic component.

2. Description of the Related Art

Recently, various semiconductor devices such as large-scale integrated circuits (LSI) have been used in information devices and the like. A semiconductor device is provided with a power circuit for supplying electric power. When a high-frequency wave is generated in association with the switching of the power source or the clock operation in the power circuit, the operation of the semiconductor device can become unstable. Therefore, it is preferred to use a capacitor having a low equivalent series inductance (ESL) in a power circuit so as to prevent the generation of a high-frequency wave in the power circuit.

JP-A 2006-100682 discloses one example of a capacitor having a low ESL (hereinafter, also referred to as "low ESL capacitor"). The capacitor disclosed in JP-A 2006-100682 includes a capacitor body formed of a dielectric material. Inside the capacitor body, a plurality of first internal electrodes and a plurality of second internal electrodes are disposed alternately in the laminating direction. The first internal electrodes are extended into the middle portions in the respective length directions of first and second lateral surfaces of the capacitor body. On the other hand, the second internal electrodes are extended into both end portions in the respective length directions of the first and second lateral surfaces of the capacitor body. On the middle portion in the length direction of the first lateral surface of the capacitor body, a first external electrode connected to the first internal electrodes is disposed. On the middle portion in the length direction of the second lateral surface of the capacitor body, a second external electrode connected to the first internal electrodes is disposed. On the first lateral surface of the capacitor body, third and fourth external electrodes that are located on the outer side of the first external electrode in the length direction, and connected with the second internal electrodes are disposed. On the second lateral surface of the capacitor body, fifth and sixth external electrodes that are located on the outer side of the second external electrode in the length direction, and connected with the second internal electrodes are disposed. As described above, JP-A 2006-100682 discloses a low ESL capacitor having three external electrodes disposed on each of the first and second lateral surfaces in the respective length direction.

SUMMARY OF THE INVENTION

There is a demand for improving the reliability of electronic components, such as low ESL capacitors.

Preferred embodiments of the present invention provide electronic components having excellent reliability.

An electronic component according to a preferred embodiment of the present invention includes an electronic component body, a first internal electrode, a second internal electrode, three or more external electrodes disposed on a first lateral surface and connected with the first or the second internal electrode, and three or more external electrodes disposed on the second lateral surface and connected with the first or the second internal electrode. The first internal electrode is connected with the external electrode that is different from the external electrode to which the second internal electrode is connected. The electronic component body includes first and second principal surfaces, first and second lateral surfaces, and first and second end surfaces. The first and second principal surfaces extend in a length direction and a width direction. The first and second lateral surfaces extend in the length direction and a laminating direction. The first and second end surfaces extend in the width direction and the laminating direction. The first internal electrode is disposed inside the electronic component body. The second internal electrode is opposite to the first internal electrode in the laminating direction inside the electronic component body. Either one of the internal electrode to which the external electrode located closest to the one side in the length direction among the three or more external electrodes disposed on the first lateral surface, and the internal electrode to which the external electrode located closest to the one side in the length direction among the three or more external electrodes disposed on the second lateral surface is the first internal electrode, and the other is the second internal electrode. Either one of the internal electrode to which the external electrode located closest to the other side in the length direction among the three or more external electrodes disposed on the first lateral surface, and the internal electrode to which the external electrode located closest to the other side in the length direction among the three or more external electrodes disposed on the second lateral surface is the first internal electrode, and the other is the second internal electrode. On the first lateral surface, two external electrodes located on the outermost side in the length direction among the three or more external electrodes disposed on the first lateral surface are thicker than the other external electrode(s). On the second lateral surface, two external electrodes located on the outermost side in the length direction among the three or more external electrodes disposed on the second lateral surface are thicker than the other external electrode(s).

In an electronic component according to a preferred embodiment of the present invention, on the first lateral surface, two external electrodes located on the outermost side in the length direction among the three or more external electrodes disposed on the first lateral surface are thicker than the other external electrode(s). On the second lateral surface, two external electrodes located on the outermost side in the length direction among the three or more external electrodes disposed on the second lateral surface are thicker than the other external electrode(s). Therefore, the end portions of the electronic component body where the water or the like is likely to enter the electronic component body are covered with the thick external electrodes, and thus the water or the like is difficult to enter the electronic component body. Therefore, the electronic component according to a preferred embodiment of the present invention has excellent reliability.

In an electronic component according to a preferred embodiment of the present invention, either one of the internal electrode to which the external electrode located closest to the one side in the length direction among the three or more external electrodes disposed on the first lateral surface, and the internal electrode to which the external electrode located closest to the one side in the length direction among the three or more external electrodes disposed on the second lateral surface is the first internal electrode, and the other is the second internal electrode. Either one of the internal electrode to which the external electrode located closest to the other side in the length direction among the three or more external electrodes disposed on the first lateral surface, and the internal electrode to which the external electrode located closest to the other side in the length direction among the three or more external electrodes disposed on the second lateral surface is the first internal electrode, and the other is the second internal electrode. Therefore, the magnetic fields are mutually cancelled between the external electrode located closest to the one side in the length direction among the three or more external electrodes disposed on the first lateral surface, and the external electrode located closest to the one side in the length direction among the three or more external electrodes disposed on the second lateral surface. Similarly, the magnetic fields are mutually cancelled between the external electrode located closest to the other side in the length direction among the three or more external electrodes disposed on the first lateral surface, and the external electrode located closest to the other side in the length direction among the three or more external electrodes disposed on the second lateral surface. Therefore, the electronic component according to a preferred embodiment of the present invention has a low ESL.

In an electronic component according to a preferred embodiment of the present invention, it is preferred that each of the three or more external electrodes disposed on the first lateral surface is opposite to either of the three or more external electrodes disposed on the second lateral surface in the width direction. In that case, it is preferred that in each of the three or more external electrodes disposed on the lateral surface, one of the two external electrodes facing each other in the width direction is connected with the first internal electrode, and the other is connected with the second internal electrode. In this case, the ESL of the electronic component is able to be further decreased.

In an electronic component according to a preferred embodiment of the present invention, the plurality of external electrodes include: a first external electrode connected with the first internal electrode, and disposed on the first lateral surface; a second external electrode connected with the first internal electrode, and disposed closest to the one side in the length direction among the external electrodes disposed on the second lateral surface; a third external electrode connected with the first internal electrode, and disposed closest to the other side in the length direction among the external electrodes disposed on the second lateral surface; a fourth external electrode connected with the second internal electrode, and disposed on the second lateral surface; a fifth external electrode connected with the second internal electrode, and disposed closest to the one side in the length direction among the external electrodes disposed on the first lateral surface; and a sixth external electrode connected with the second internal electrode, and disposed closest to the other side in the length direction among the external electrodes disposed on the first lateral surface, and on the first lateral surface, each of the fifth and sixth external electrodes may be thicker than the first external electrode, and on the second lateral surface, each of the second and third external electrodes may be thicker than the fourth external electrode. Also in this case, it is possible to realize excellent reliability and a low ESL.

In an electronic component according to a preferred embodiment of the present invention, it is preferred that among the plurality of external electrodes, the external electrodes located on the outermost side in the length direction cover a ridge defined by the first lateral surface and the first principal surface, a ridge defined by the second lateral surface and the first principal surface, a ridge defined by the first lateral surface and the second principal surface, a ridge defined by the second lateral surface and the second principal surface, a ridge defined by the first lateral surface and the first end surface, a ridge defined by the first lateral surface and the second end surface, a ridge defined by the second lateral surface and the first end surface, a ridge defined by the second lateral surface and the second end surface, a ridge defined by the first principal surface and the first end surface, a ridge defined by the first principal surface and the second end surface, a ridge defined by the second principal surface and the first end surface, and a ridge defined by the second principal surface and the second end surface. In this configuration, since the ridges of the ceramic element assembly are desirably protected by the external electrodes, cracking or chipping is unlikely to occur in the ceramic element assembly.

In an electronic component according to a preferred embodiment of the present invention, it is preferred that the plurality of external electrodes each include a base electrode layer disposed on the lateral surface, and a Ni plating layer disposed on the base electrode layer; on the first lateral surface, the Ni plating layers of the two external electrodes located on the outermost side in the length direction among the three or more external electrodes disposed on the first lateral surface are thicker than the Ni plating layer(s) of the other external electrode(s); and on the second lateral surface, the Ni plating layers of the two external electrodes located on the outermost side in the length direction among the three or more external electrodes disposed on the second lateral surface are thicker than the Ni plating layer(s) of the other external electrode(s). In this case, since the sealability of the external electrodes located on the outermost side in the length direction is improved, the reliability of the electronic component is further improved.

In an electronic component according to a preferred embodiment of the present invention, it is preferred that the plurality of external electrodes each include a base electrode layer disposed on the lateral surface, and a Ni plating layer disposed on the base electrode layer; on the first lateral surface, the Sn plating layers of the two external electrodes located on the outermost side in the length direction among the three or more external electrodes disposed on the first lateral surface are thinner than the Sn plating layer(s) of the other external electrode(s); and on the second lateral surface, the Sn plating layers of the two external electrodes located on the outermost side in the length direction among the three or more external electrodes disposed on the second lateral surface are thinner than the Sn plating layer(s) of the other external electrode(s).

In an electronic component according to a preferred embodiment of the present invention, it is preferred that the first internal electrode includes a first opposing portion opposite to the second internal electrode in the laminating direction; the second internal electrode includes a second opposing portion opposite to the first internal electrode in the laminating direction; and a distance in the length direction between the first and the second opposing portions and the first or the second end surface is about 10 µm or more and about 70 µm or less, for example. By setting the distance in the length direction between the first and the second opposing portions and the first or the second end surface to be about 10 µm or more, it is possible to improve the reliability of the electronic component. By setting the distance in the length direction between the first and the second opposing portions and the first or the second end surface to be about 70 μm or less, it is possible to realize a large capacitance and a low ESL, for example, when the electronic component is a capacitor.

In an electronic component according to a preferred embodiment of the present invention, it is preferred that the first internal electrode includes a first opposing portion opposite to the second internal electrode in the laminating direction; the second internal electrode includes a second opposing portion opposite to the first internal electrode in the laminating direction; and a distance in the width direction between the first and the second opposing portions and the first or the second lateral surface is about 10 μm or more and about 70 μm or less, for example. By setting the distance in the width direction between the first and the second opposing portions and the first or the second lateral surface to be about 10 μm or more, it is possible to improve the reliability of the electronic component. By setting the distance in the width direction between the first and the second opposing portions and the first or the second lateral surface to be about 70 μm or less, it is possible to realize a large capacitance and a low ESL, for example, when the electronic component is a capacitor.

According to various preferred embodiments of the present invention, it is possible to provide electronic components having excellent reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
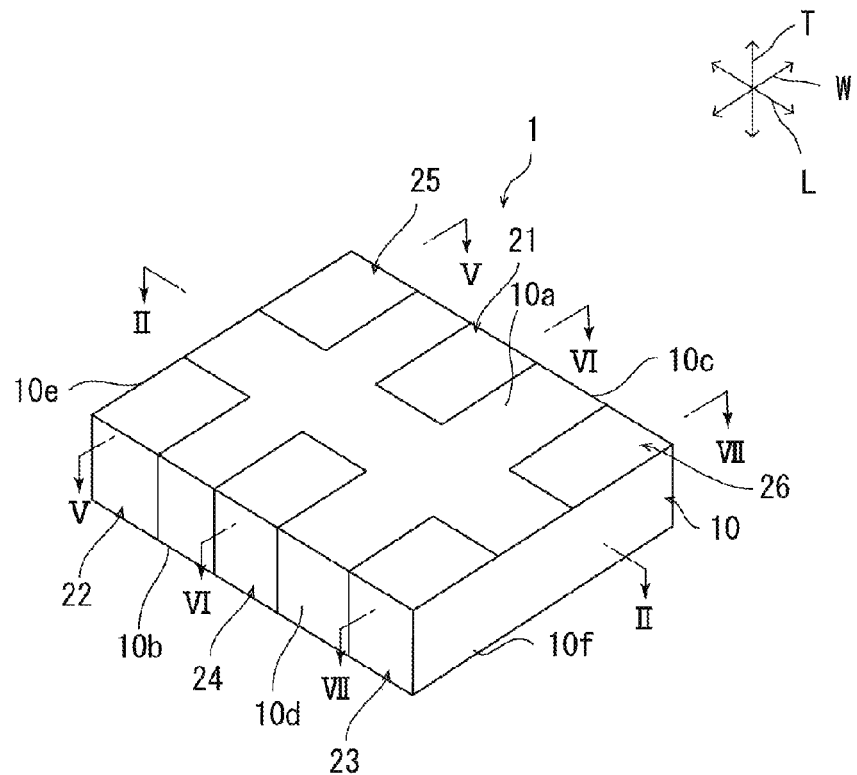
FIG. 1 is a schematic perspective view of a capacitor according to a first preferred embodiment of the present invention.

Hereinafter, examples of preferred embodiments of the present invention will be described. The following preferred embodiments are given merely for illustration. The present invention is not limited in any way by the following preferred embodiments.

In each drawing that is referred to in preferred embodiments and the like, an element or member having the same or substantially the same function is denoted by the same reference numeral. Drawings that are referred to in the description of the preferred embodiments and the like are schematically depicted. The dimensional ratio and the like of objects depicted in each drawing may be different from the actual dimensional ratio of the objects. Also between different drawings, the dimensional ratio and the like of objects can be different. Specific dimensional ratio and the like should be determined referring to the following description.

First Preferred Embodiment

Figure 2:
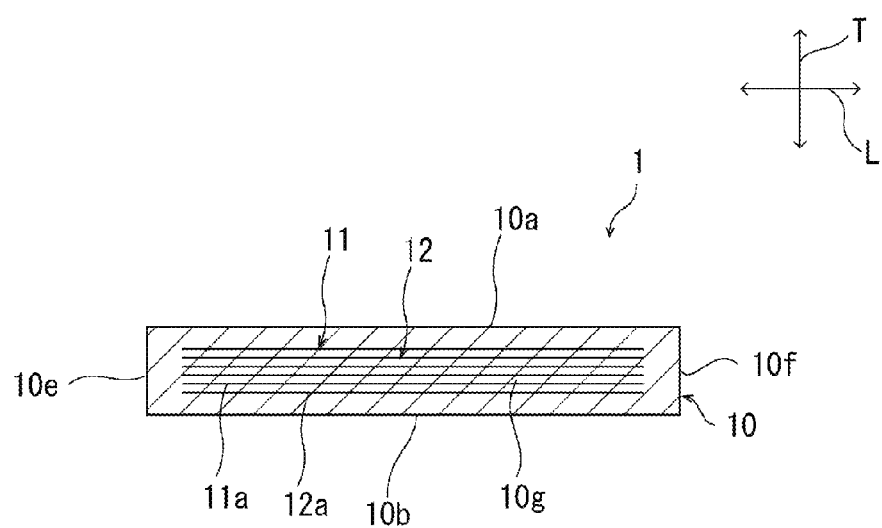
FIG. 2 is a schematic section view along line II-II in FIG. 1.
Figure 3:
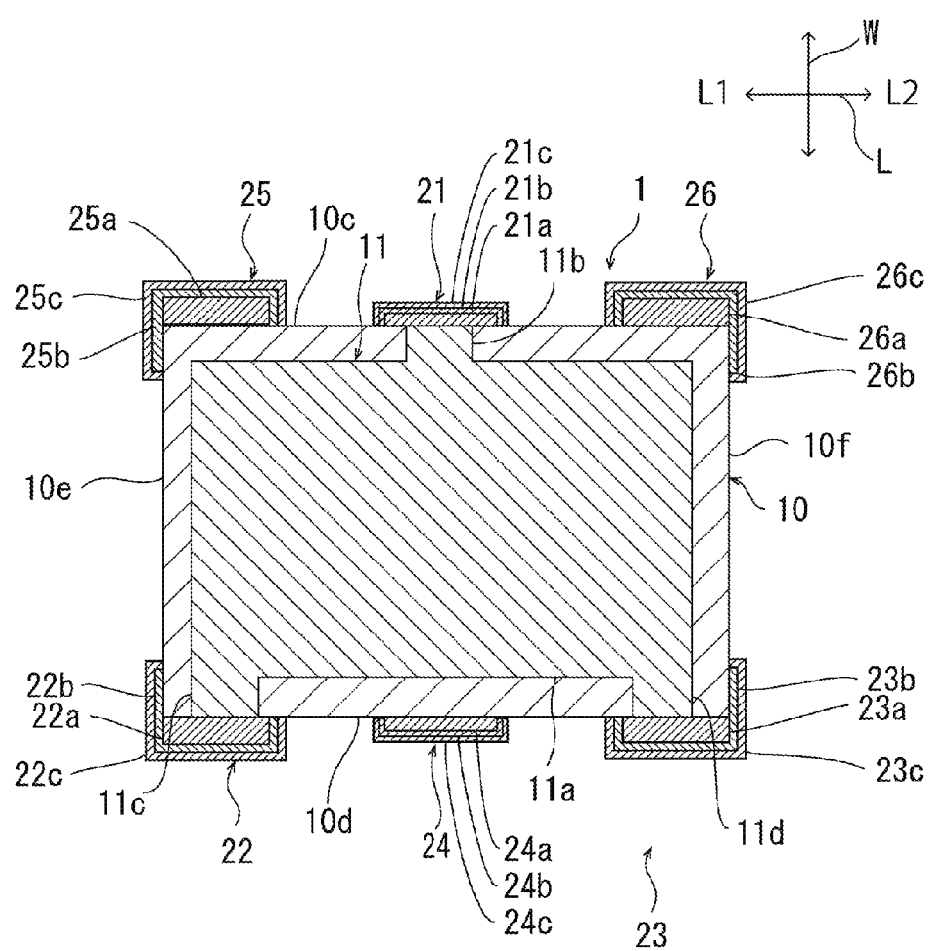
FIG. 3 is a schematic section view of the capacitor according to the first preferred embodiment of the present invention.
Figure 4:
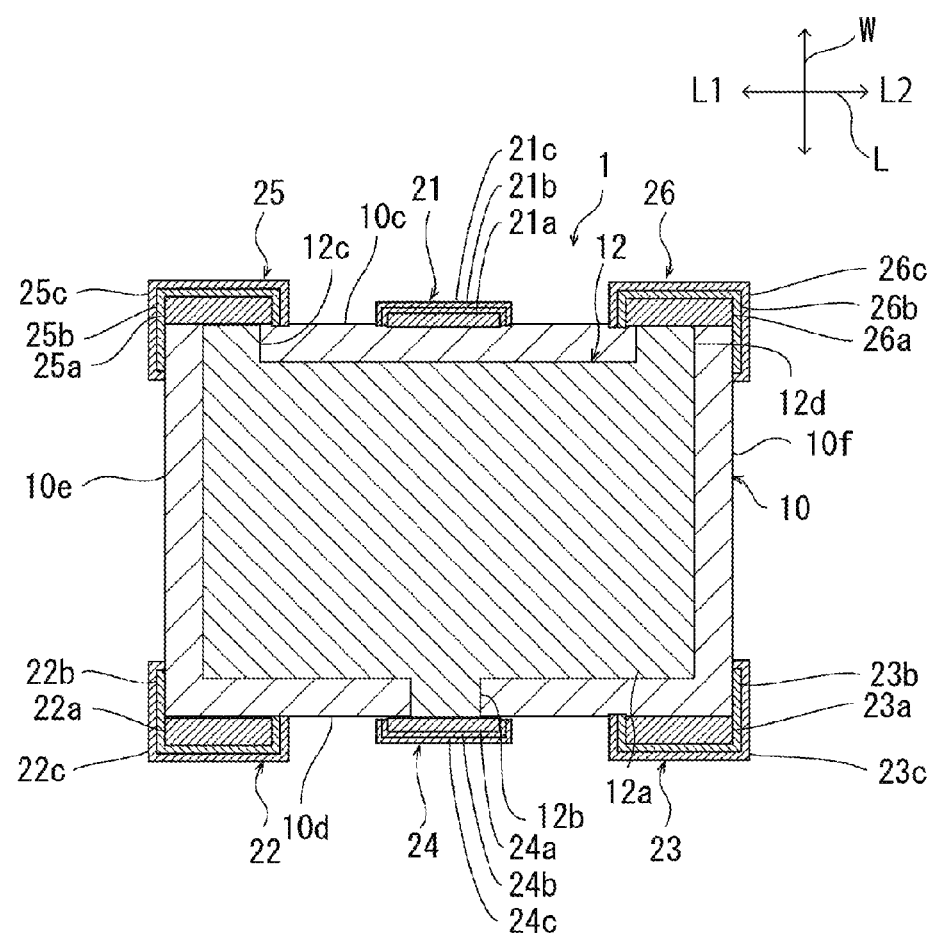
FIG. 4 is a schematic section view of the capacitor according to the first preferred embodiment of the present invention.
Figure 5:
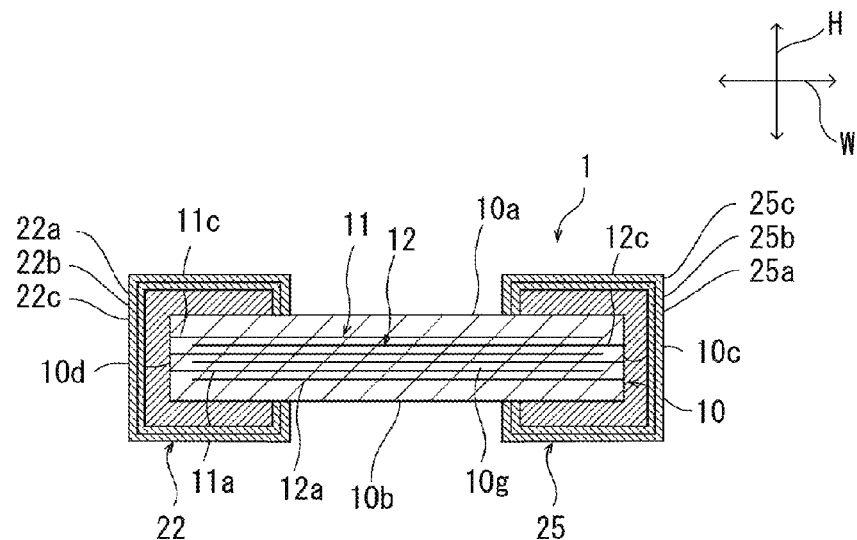
FIG. 5 is a schematic section view along line V-V in FIG. 1.
Figure 6:
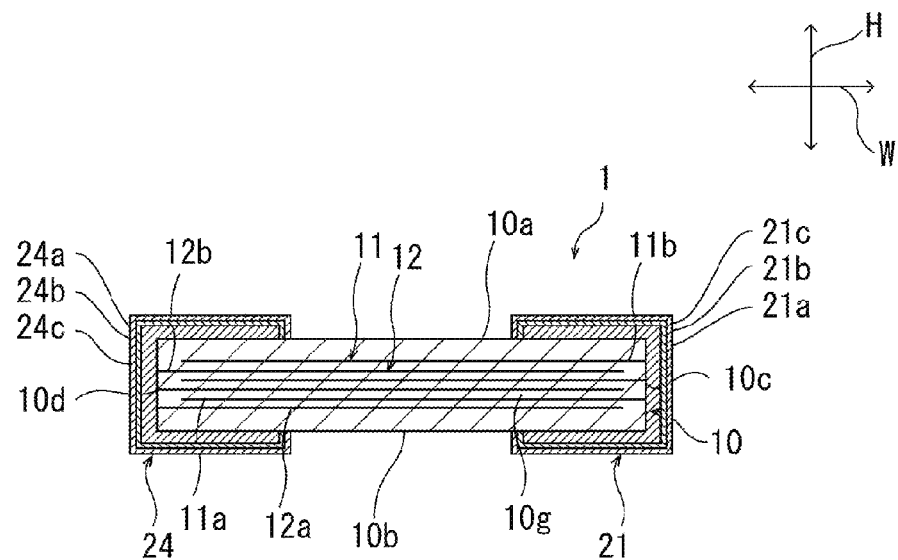
FIG. 6 is a schematic section view along line VI-VI in FIG. 1.
Figure 7:
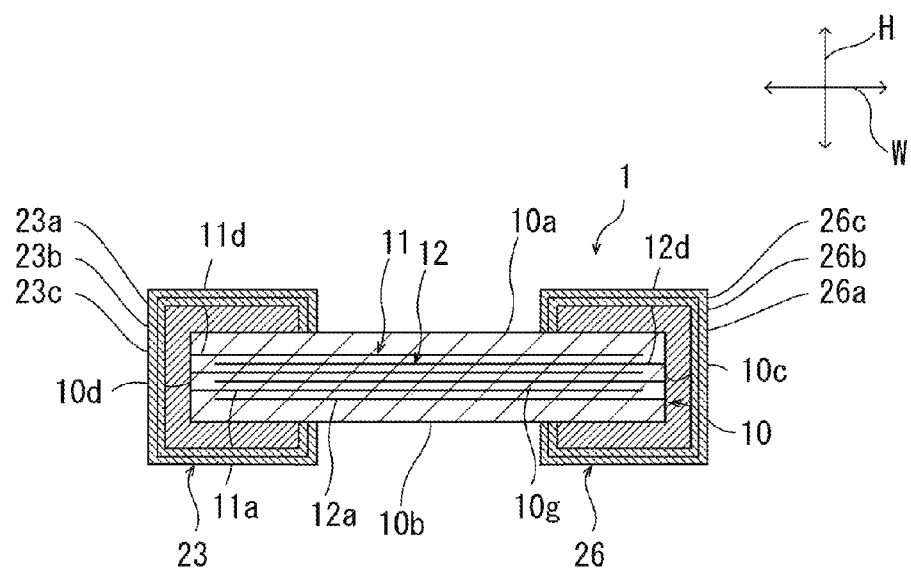
FIG. 7 is a schematic section view along line VII-VII in FIG. 1.

FIG. 1 is a schematic perspective view of a capacitor according to a first preferred embodiment of the present invention. FIG. 2 is a schematic section view along line II-II in FIG. 1. FIG. 3 is a schematic section view of the capacitor according to the first preferred embodiment. FIG. 4 is a schematic section view of the capacitor according to the first preferred embodiment. FIG. 5 is a schematic section view along line V-V in FIG. 1. FIG. 6 is a schematic section view along line VI-VI in FIG. 1. FIG. 7 is a schematic section view along line VII-VII in FIG. 1.

As shown in FIG. 1 to FIG. 7, a capacitor 1 includes a capacitor body (electronic component body) 10. The capacitor body 10 preferably has a rectangular or substantially rectangular parallelepiped shape. The capacitor body 10 includes a first and a second principal surfaces 10a, 10b, a first and a second lateral surfaces 10c, 10d, and a first and a second end surfaces 10e, 10f. Each of the first and the second principal surfaces 10a, 10b extends in a length direction L and a width direction W. The width direction W is perpendicular to the length direction L. Each of the first and the second lateral surfaces 10c, 10d extends in the length direction L and a laminating direction T. The laminating direction T is perpendicular to each of the length direction L and the width direction W. Each of the first and the second end surfaces 10e, 10f extends in the width direction W and the laminating direction T. Ridges and corners of the capacitor body 10 may have chamfered shapes or rounded shapes, however, from the view point of preventing generation of cracks, they preferably have rounded shapes.

The capacitor body 10 can be formed, for example, of appropriate dielectric ceramics. Specifically, the capacitor body 10 may be formed of dielectric ceramics including, for example, $BaTiO_3$, $CaTiO_3$, $SrTiO_3$, and $CaZrO_3$. The capacitor body may also include an additive such as Mn compounds, Fe compounds, Cr compounds, Co compounds, Ni compounds and so on.

In the present preferred embodiment, description will be made while taking the capacitor 1 as an example of an electronic component according to a preferred embodiment of the present invention. It is to be noted that the electronic component according to a preferred embodiment of the present invention is not limited to a capacitor. The electronic component according to a preferred embodiment of the present invention may be, for example, a piezoelectric component, a thermistor, and an inductor.

When the electronic component according to a preferred embodiment of the present invention is a piezoelectric component, the electronic component body can be formed of piezoelectric ceramics. Specific examples of the piezoelectric ceramics include PZT (lead zirconate titanate) ceramics.

When the electronic component according to a preferred embodiment of the present invention is a thermistor, the electronic component body can be formed of semiconductor ceramics. Specific examples of the semiconductor ceramics include spinel ceramics.

When the electronic component according to a preferred embodiment of the present invention is an inductor, the electronic component body can be formed of magnetic ceramics. Specific examples of the magnetic ceramics include ferrite ceramic.

Letting the height dimension of the capacitor body 10 be DT, the length dimension be DL, and the width dimension be DW, the dimension of the capacitor body 10 preferably satisfies, but is not limited to, DT<DW<DL, and DT<0.7 mm. Also, preferably, 0.05 mm≤DT<0.5 mm, 0.4 mm≤DL≤1.2 mm, and 0.3 mm≤DW≤0.7 mm are satisfied.

As shown in FIG. 2, a plurality of internal electrodes 11, 12 are provided inside the capacitor body 10. To be more specific, inside the capacitor body 10, a plurality of the first internal electrodes 11, and a plurality of the second internal electrodes 12 are alternately disposed in the laminating direction T. The first internal electrode 11 and the second internal electrode 12 that are adjacent to each other in the laminating direction T are opposite to each other with a ceramic portion 10g interposed therebetween. Preferably, the thickness of the ceramic portion 10g is, for example, about 0.5 μm or more and about 3 μm or less.

In the capacitor body 10, the thickness of the portion where the first and the second internal electrodes 11, 12 are not disposed in the laminating direction T (distance in the laminating direction T between the portion where the first and the second internal electrodes 11, 12 are disposed, and the principal surface) is preferably about 10 μm or more and about 80 μm or less.

The thickness of the first and the second internal electrodes 11, 12 can be, for example, about 0.4 μm or more and about 1 μm or less.

The first and the second internal electrodes 11, 12 can be formed of an appropriate conductive material. The first and the second internal electrodes can be formed, for example, of metal such as Ni, Cu, Ag, Pd, and Au, or alloys containing one of these metals, such as an Ag—Pd alloy. More preferably, the first and the second internal electrodes 11, 12 contain Ni. The first and the second internal electrodes 11, 12 may contain dielectric grains (common material) having a composition system similar to that of the ceramics contained in the capacitor body 10.

As shown in FIG. 3, the first internal electrode 11 is exposed on each of the first lateral surface 10c and the second lateral surface 10d. The first internal electrode 11 is not exposed on the first and the second end surfaces 10e, 10f. Specifically, the first internal electrode 11 has an opposing portion 11a, a first extended portion 11b, a second extended portion 11c, and a third extended portion 11d. The opposing portion 11a is opposite to the second internal electrode 12 in the laminating direction T. The opposing portion 11a preferably has a rectangular or substantially rectangular shape. The first extended portion 11b is connected with the opposing portion 11a. The first extended portion 11b is extended to the first lateral surface 10c. The second extended portion 11c is connected with the opposing portion 11a. The second extended portion 11c is extended to the second lateral surface 10d. The third extended portion 11d is connected with the opposing portion 11a. The third extended portion 11d is extended to the second lateral surface 10d. The second extended portion 11c is extended to a L1 side end portion of the length direction L, while the third extended portion 11d is extended to a L2 side end portion of the length direction L.

As shown in FIG. 4, the second internal electrode 12 is exposed on each of the first and the second lateral surfaces 10c, 10d. The second internal electrode 12 is not exposed on the first and the second end surfaces 10e, 10f. Specifically, the second internal electrode 12 includes an opposing portion 12a, a fourth extended portion 12b, a fifth extended portion 12c, and a sixth extended portion 12d. The opposing portion 12a is opposite to the opposing portion 11a in the laminating direction T. The opposing portion 12a preferably has a rectangular or substantially rectangular shape. The fourth extended portion 12b is connected with the opposing portion 12a. The fifth extended portion 12c is extended to the second lateral surface 10d. The sixth extended portion 12d is connected with the opposing portion 12a. The sixth extended portion 12d is extended to the first lateral surface 10c.

Preferably, the distance in the length direction L between the first and the second opposing portions 11a, 12a and the first or the second end surface 10e, 10f is about 10 μm or more and about 70 μm or less, for example. By setting the distance in the length direction L between the first and the second opposing portions 11a, 12a and the first or the second end surface 10e, 10f to be about 10 μm or more, it is possible to improve the reliability of the capacitor 1. By setting the distance in the length direction L between the first and the second opposing portions 11a, 12a and the first or the second end surface 10e, 10f to be about 70 μm or less, it is possible to increase the capacitance of the capacitor 1. From this point of view, the distance in the length direction L between the first and the second opposing portions 11a, 12a and the first or the second end surface 10e, 10f is preferably about 55 μm or less, and more preferably about 40 μm or less, for example.

Preferably, the distance in the width direction W between the first and the second opposing portions 11a, 12a and the first or the second lateral surface 10c, 10d is about 10 μm or more and about 70 μm or less, for example. By setting the distance in the width direction W between the first and the second opposing portions 11a, 12a and the first or the second lateral surface 10c, 10d to be about 10 μm or more, it is possible to improve the reliability of the capacitor 1. By setting the distance in the width direction W between the first and the second opposing portions 11a, 12a and the first or the second lateral surface 10c, 10d to be about 70 μm or less, it is possible to increase the capacitance of the capacitor 1, and also it is possible to decrease the ESL. From this point of view, the distance in the width direction W between the first and the second opposing portions 11a, 12a and the first or the second lateral surface 10c, 10d is more preferably about 55 μm or less, and further preferably about 40 μm or less, for example.

The width of the extended portion 11b, 11c, 11d, 12b, 12c, 12d can be, for example, about 80 μm or more and about 140 μm or less, for example.

Preferably, the extended portion 11c, 11d, 12c, 12d located on each end in the length direction L is not exposed on the end surface 10e, 10f of the capacitor body 10. In this case, it is possible to effectively reduce or prevent the entry of the water or the like into the capacitor body 10 from the end surface 10e, 10f. Therefore, it is possible to further increase the reliability of the capacitor 1.

As shown in FIG. 1, FIG. 3 and FIG. 4, the capacitor 1 includes a plurality of external electrodes 21 to 26.

As shown in FIG. 3, a first external electrode 21 is disposed on the first lateral surface 10c. As shown in FIG. 1 and FIG. 6, the first external electrode 21 is disposed on each of the first and the second principal surfaces 10a, 10b so as to straddle these principal surfaces from above the first lateral surface 10c. As shown in FIG. 3, the exposed portion of the first extended portion 11b of the first internal electrode 11 is covered with the first external electrode 21.

A second external electrode 22 is disposed on the second lateral surface 10d. As shown in FIG. 1 and FIG. 5, the second external electrode 22 is disposed on each of the first and the second principal surfaces 10a, 10b so as to straddle these principal surfaces from above the second lateral surface 10d. As shown in FIG. 3, the exposed portion of the second extended portion 11c of the first internal electrode 11 is covered with the second external electrode 22.

The third external electrode 23 is disposed on the second lateral surface 10d. As shown in FIG. 1 and FIG. 7, the third external electrode 23 is disposed on each of the first and the second principal surfaces 10a, 10b so as to straddle these principal surfaces from above the second lateral surface 10d. As shown in FIG. 3, the exposed portion of the third extended portion 11d of the first internal electrode 11 is covered with the third external electrode 23.

As shown in FIG. 4, a fourth external electrode 24 is disposed on the second lateral surface 10d. As shown in FIG. 1 and FIG. 6, the fourth external electrode 24 is disposed on each of the first and the second principal surfaces 10a, 10b so as to straddle these principal surfaces from above the second lateral surface 10d. As shown in FIG. 4, the exposed portion of the first extended portion 12b of the second internal electrode 12 is covered with the fourth external electrode 24.

A fifth external electrode 25 is disposed on the first lateral surface 10c. As shown in FIG. 1 and FIG. 5, the fifth external electrode 25 is disposed on each of the first and the second principal surfaces 10a, 10b so as to straddle these principal surfaces from above the first lateral surface 10c. As shown in FIG. 4, the exposed portion of the second extended portion 12c of the second internal electrode 12 is covered with the fifth external electrode 25.

A sixth external electrode 26 is disposed on the first lateral surface 10c. As shown in FIG. 1 and FIG. 7, the sixth external electrode 26 is disposed on each of the first and the second principal surfaces 10a, 10b so as to straddle these principal surfaces from above the first lateral surface 10c. As shown in FIG. 4, the exposed portion of the third extended portion 12d of the second internal electrode 12 is covered with the sixth external electrode 26.

Preferably, the external electrodes 21 to 26 completely cover the extended portions 11a to 11c, 12a to 12c of the internal electrodes 11, 12. In other words, preferably, the extended portions 11a to 11c, 12a to 12c of the internal electrodes 11, 12 are not exposed from the external electrodes 21 to 26. In this case, since the entry of the water into the capacitor body 10 is able to be reduced or prevented more effectively, it is possible to further increase the reliability of the capacitor 1. From the view point of further increasing the reliability of the capacitor 1, it is preferred that the width of the external electrode 22, 23, 25, 26 covering the extended portion 11b, 11c, 12b, 12c is larger than the width of the extended portion 11b, 11c, 12b, 12c located on each end in the length direction L by about 120 μm or more, for example.

As described above, in the capacitor 1, on each of the first and the second lateral surfaces 10c, 10d, three or more external electrodes connected with the first or the second internal electrode 11, 12 are disposed. Specifically, as shown in FIG. 3 and FIG. 4, the first external electrode 21, the fifth external electrode 25, and the sixth external electrode 26 are disposed on the first lateral surface 10c. The first external electrode 21 is disposed in the middle portion in the length direction L of the first lateral surface 10c. The first external electrode 21 is located between the fifth external electrode 25 and the sixth external electrode 26 in the length direction L. The fifth external electrode 25 is located closest to the L1 side in the length direction L among the external electrodes 21, 25, 26 disposed on the first lateral surface 10c. The sixth external electrode 26 is located closest to the L2 side in the length direction L among the external electrodes 21, 25, 26 disposed on the first lateral surface 10c.

On the second lateral surface 10d, the fourth external electrode 24, the second external electrode 22, and the third external electrode 23 are disposed. The fourth external electrode 24 is disposed in the middle portion in the length direction L of the second lateral surface 10d. The fourth external electrode 24 is located between the second external electrode 22 and the third external electrode 23 in the length direction L. The second external electrode 22 is located closest to the L1 side in the length direction L among the external electrodes 24, 22, 23 disposed on the second lateral surface 10d. The third external electrode 23 is located closest to the L2 side in the length direction L among the external electrodes 24, 22, 23 located on the second lateral surface 10d.

As described above, the first and the second internal electrodes 11, 12 are connected not only with the external electrodes located on each end in the length direction L on the lateral surfaces 10c, 10d, but also with the external electrodes that are not located on each end. Therefore, it is possible to further increase the connecting reliability between the internal electrodes 11, 12 and the external electrodes 21 to 26.

Each of the first to sixth external electrodes 21 to 26 includes a laminate of base electrode layers 21a to 26a, Ni plating layers 21b to 26b, and Sn plating layers 21c to 26c.

The base electrode layers 21a to 26a are disposed on the capacitor body 10. The base electrode layers 21a to 26a may include, for example, a fired electrode layer, a plating layer, and a conductive resin layer. The fired electrode layer is an electrode that is formed by sintering an applied conductive paste. Preferably, the base electrode layer contains at least one metal selected from the group consisting of, for example, Cu, Ni, Ag, Pd, Ag—Pd alloy, and Au. The base electrode layer preferably contains glass. The glass contained in the base electrode layer preferably contains Si, Zn. The thickness of the base electrode layer 21a, 24a is preferably about 18 μm or more and about 22 μm or less, for example. The thickness of the base electrode layer 22a, 23a, 25a, 26a is preferably about 20 μm or more and about 28 μm or less, for example.

The Ni plating layers 21b to 26b are disposed on the fired electrode layers 21a to 26a. By providing the Ni plating layers 21b to 26b, it is possible to effectively reduce or prevent the erosion of the fired electrode layers 21a to 26a by a solder when the capacitor 1 is mounted on the mounting board, for example, by using the solder. The thickness of the Ni plating layers 21b, 24b can be, for example, about 2 µm or more and about 7 µm or less. The thickness of the Ni plating layers 22b, 23b, 25b, 26b can be, for example, about 3 µm or more and about 8 µm or less.

The Sn plating layers 21c to 26c are disposed on the Ni plating layers 21b to 26b. The thickness of the Sn plating layers 21b, 24c can be, for example, about 3 µm or more and about 8 µm or less. The thickness of the Sn plating layers 22c, 23c, 25c, 26c can be, for example, about 2 µm or more and about 7 µm or less.

In the present preferred embodiment, description has been made for the example where each of the external electrodes 22 to 26 extends onto the first and the second principal surfaces 10a, 10b. It is to be noted that the present invention is not limited to this configuration. For example, the external electrodes may be provided only on the lateral surfaces.

By the way, there is a demand for improving the reliability of a capacitor. As a result of diligent efforts, the present inventors discovered that the deterioration in the reliability is caused by the entry of the water or the like into the capacitor body. Furthermore, as a result of diligent efforts, the present inventors discovered that the entry of the water from the portion covered with the external electrode located on the outermost side in the length direction of each lateral surface in the capacitor body is the major cause of the deterioration in the reliability. Based on these discoveries, the present inventors conceived of and developed preferred embodiments of the present invention.

In this context, the deterioration in the reliability caused by the water is ascribable to the migration of protons ($H^+$) generated by electrolysis of the water having entered from the positive electrode, into the negative electrode side. Therefore, the deterioration in the reliability caused by the water is less likely to occur when the positive electrode that generates protons is not present as much as possible in each end portion in the length direction.

Here, in the capacitor 1, the internal electrode 12 to which the external electrode 25 located closest to the L1 side in the length direction L on the first lateral surface 10c is connected (see FIG. 4), and the internal electrode 11 to which the external electrode 22 located closest to the L1 side in the length direction L on the second lateral surface 10d is connected (see FIG. 3) are different from each other. Also in the capacitor 1, the internal electrode 12 to which the external electrode 26 located closest to the L2 side in the length direction L on the first lateral surface 10c is connected (see FIG. 4), and the internal electrode 11 to which the external electrode 23 located closest to the L2 side in the length direction L on the second lateral surface 10d is connected (see FIG. 3) are different from each other. Therefore, not both of the external electrodes 22, 25 located closest to the L1 side in the length direction L are positive electrodes, but one of them is a negative electrode. Therefore, it is possible to improve the reliability as compared with the case where both of the two external electrodes located closest to the L1 side in the length direction L are positive electrodes. Also, not both of the external electrodes 23, 26 located closest to the L2 side in the length direction L are positive electrodes, but one of them is a negative electrode. Therefore, it is possible to improve the reliability as compared with the case where both of the two external electrodes located closest to the L2 side in the length direction L are positive electrodes.

Further, the external electrodes 25, 26 located on the outermost side in the length direction L on the first lateral surface 10c are thicker than the other external electrode 21. Therefore, the external electrodes 25, 26 are excellent in sealability. Since each end portion in the length direction L of the first lateral surface 10c where the water or the like is likely to enter is covered with the external electrodes 25, 26 having excellent sealability, it is possible to effectively reduce or prevent the entry of the water or the like into the capacitor body 10. Therefore, it is possible to further improve the reliability of the capacitor 1.

Similarly, the external electrodes 22, 23 located on the outermost side in the length direction L on the second lateral surface 10d are thicker than the other external electrode 24. Therefore, the external electrodes 22, 23 are excellent in sealability. Since each end portion in the length direction L of the second lateral surface 10d where the water or the like is likely to enter is covered with the external electrodes 22, 23 having excellent sealability, it is possible to effectively reduce or prevent the entry of the water or the like into the capacitor body 10. Therefore, it is possible to further improve the reliability of the capacitor 1.

From the view point of further increasing the reliability of the capacitor 1, the Ni plating layers 25b, 26b of the external electrodes 25, 26 located on the outermost side in the length direction L on the first lateral surface 10c are preferably thicker than the Ni plating layer 21b of the other external electrode 21, more preferably thicker than the Ni plating layer 21b of the other external electrode 21 by about 0.2 µm or more, and further preferably thicker than the Ni plating layer 21b of the other external electrode 21 by about 0.4 µm or more, for example. The Ni plating layers 22b, 23b of the external electrodes 22, 23 located on the outermost side in the length direction L on the second lateral surface 10d are preferably thicker than the Ni plating layer 24b of the other external electrode 24, more preferably thicker than the Ni plating layer 24b of the other external electrode 24 by about 0.2 µm or more, and further preferably thicker than the Ni plating layer 24b of the other external electrode 24 by about 0.4 µm or more, for example.

Also, as described above, the external electrodes 25, located on the outermost side in the length direction L on the first lateral surface 10c are thicker than the other external electrode 21. The external electrodes 22, 23 located on the outermost side in the length direction L on the second lateral surface 10d is thicker than the other external electrode 24. Therefore, in mounting the capacitor 1 onto the mounting board by using a solder ball or the like, for example, the external electrodes 22, 23, 25, 26 located on outer sides in the length direction L come into contact with the molten solder prior to the other external electrodes 21, 24. As a result, the mounting position of the capacitor 1 is self-aligned. Therefore, the capacitor 1 is excellent in self-alignability, and can be easily mounted at a desired position on the mounting board with high positional accuracy.

On the other hand, when the external electrode 21 is thicker than the external electrodes 25, 26, and the external electrode 24 is thicker than the external electrodes 22, 23, the external electrodes 21, 24 located in the middle portion in the length direction L come into contact with the molten solder first, so that the capacitor is more likely to rotate or incline. Therefore, the self-alignability is deteriorated.

From the view point of further increasing the self-alignability of the capacitor 1, the Sn plating layers 25c, 26c of the external electrodes 25, 26 located on the outermost side in the length direction L on the first lateral surface 10c are preferably thinner than the Sn plating layer 21c of the other external electrode 21, more preferably thinner than the Sn plating layer 21c of the other external electrode 21 by about 0.3 µm or more, and further preferably thinner than the Sn plating layer 21c of the other external electrode 21 by about 0.5 µm or more, for example. The Sn plating layers 22c, 23c of the external electrodes 22, 23 located on the outermost side in the length direction L on the second lateral surface 10d are preferably thinner than the Sn plating layer 24c of the other external electrode 24, more preferably thinner than the Sn plating layer 24c of the other external electrode 24 by about 0.3 µm or more, and further preferably thinner than the Sn plating layer 24c of the other external electrode 24 by about 0.5 µm or more, for example.

The external electrode 22 and the external electrode 25 that are located on the L1 side in the length direction L and are opposite to each other in the width direction W have different polarities. The external electrode 23 and the external electrode 26 that are located on the L2 side in the length direction L and are opposite to each other in the width direction W have different polarities. Further, the external electrode 21 and the external electrode 24 that are opposite to each other in the width direction W have different polarities. Thus, since the external electrodes that are opposite to each other in the width direction W have mutually different polarities, and the polarities are cancelled, the capacitor 1 has a low ESL. Thus, from the view point of realizing a low ESL, it is preferred that not only the external electrodes located on the outer side in the length direction L, but also all the external electrodes 21, 25, 26 disposed on the first lateral surface 10c are opposite to either of the external electrodes 22, 23, 24 disposed on the second lateral surface 10d in the width direction W, and the internal electrodes to which the external electrodes opposite to each other in the width direction W are connected are different from each other (having different polarities).

Next, a non-limiting example of a production method of the capacitor 1 will be described.

First, a ceramic green sheet, a conductive paste for an internal electrode, and a conductive paste for an external terminal electrode are prepared. The ceramic green sheet and the conductive pastes may contain a binder and a solvent. The binder and the solvent used in the ceramic green sheet and the conductive pastes can be those known in the art.

Next, on the ceramic green sheet, the conductive paste is printed in a predetermined pattern, for example, by the screen printing or the gravure printing, to form an internal electrode pattern.

Next, a predetermined number of ceramic green sheets for an outer layer on which an internal electrode pattern is not printed are laminated, and ceramic green sheets on which an internal electrode pattern is printed are sequentially laminated thereon, and a predetermined number of ceramic green sheets for an outer layer are laminated thereon, and thus a mother laminate is prepared. Then the mother laminate is pressed in the laminating direction by isostatic pressing or the like.

Next, the mother laminate is cut into a predetermined size and a raw ceramic laminate is cut out. At this time, ridges and corners of the raw ceramic laminate may be rounded by barrel finishing or the like.

On an internal electrode exposed portion that is exposed on the lateral surface of the raw ceramic laminate that is cut into a predetermined size, an electrode paste for forming the fired electrode layers 21a to 26a is applied. The method for applying the electrode paste is not limited. The method for applying the electrode paste can be, for example, a roller transfer method.

Next, by firing the raw ceramic laminate, the capacitor body 10 is obtained. The sintering temperature is preferably about 900° C. or more and about 1300° C. or less, for example, depending on the ceramic material and conductive material used. Thereafter, ridges and corners of the capacitor body 10 may be rounded by subjecting the capacitor body 10 to barrel finishing or the like.

Next, the Ni plating layers 21b to 26b are formed, and then the Sn plating layers 21c to 26c are formed, and thus the capacitor 1 is completed. Hereinafter, other examples of preferred embodiments of the present invention will be described. In the following description, the element or member having a function that is the same or substantially common to that in the first preferred embodiment is denoted by the common reference numeral, and the description thereof is omitted.

Second Preferred Embodiment

Figure 8:
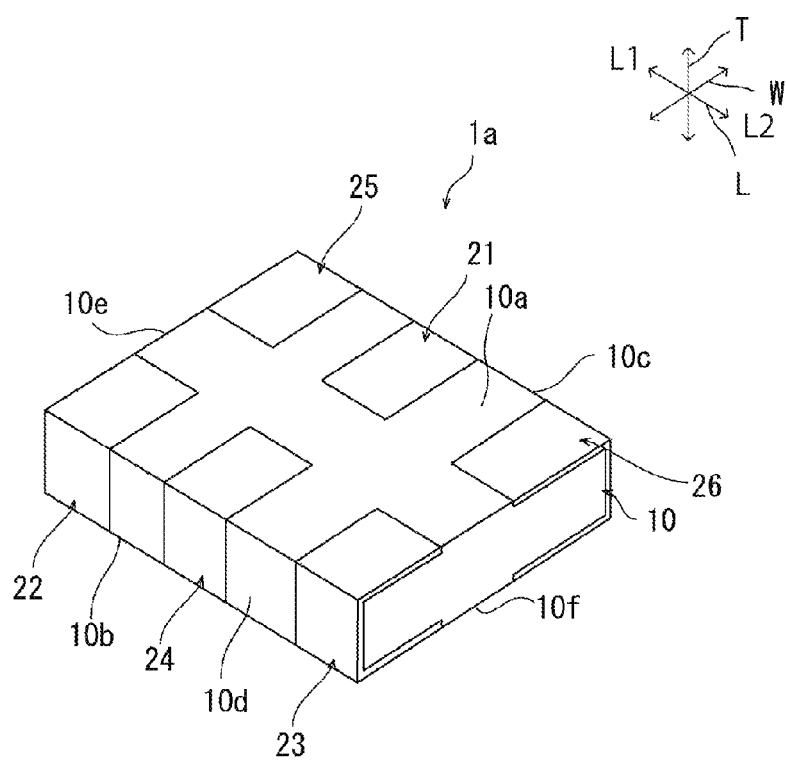
FIG. 8 is a schematic perspective view of a capacitor according to a second preferred embodiment of the present invention.

FIG. 8 is a schematic perspective view of a capacitor according to a second preferred embodiment of the present invention. A capacitor 1a in FIG. 8 is different from the capacitor 1 according to the first preferred embodiment in that the external electrodes 22, 23, 25, 26 located on the outermost side in the length direction L cover the ridge defined by the first or the second lateral surface 10c, 10d and the principal surface 10a, the ridge defined by the first or the second lateral surface 10c, 10d and the second principal surface 10b, and the ridge defined by the first or the second lateral surface 10c, 10d and the first or the second end surface 10e, 10f. Specifically, each of the external electrodes 22, 25 disposed on the L1 side in the length direction L covers the ridge defined by the first or the second lateral surface 10c, 10d and the principal surface 10a, the ridge defined by the first or the second lateral surface 10c, 10d and the second principal surface 10b, and the ridge defined by the first or the second lateral surface 10c, 10d and the first end surface 10e. Each of the external electrodes 23, 26 disposed on the L2 side in the length direction L covers the ridge defined by the first or the second lateral surface 10c, 10d and the first principal surface 10a, the ridge defined by the first or the second lateral surface 10c, 10d and the principal surface 10b, and the ridge defined by the first or the second lateral surface 10c, 10d and the second end surface 10f.

In the manner as described above, in the capacitor 1a, the ridges of the capacitor body 10 are protected by the external electrodes 22, 23, 25, 26. Therefore, even when an impact or a stress is exerted on the capacitor 1a from outside and the stress is concentrated in the ridges of the capacitor body 10, the capacitor body 10 is difficult to be damaged. Therefore, it is possible to improve the reliability of the capacitor 1a.

Third Preferred Embodiment

Figure 9:
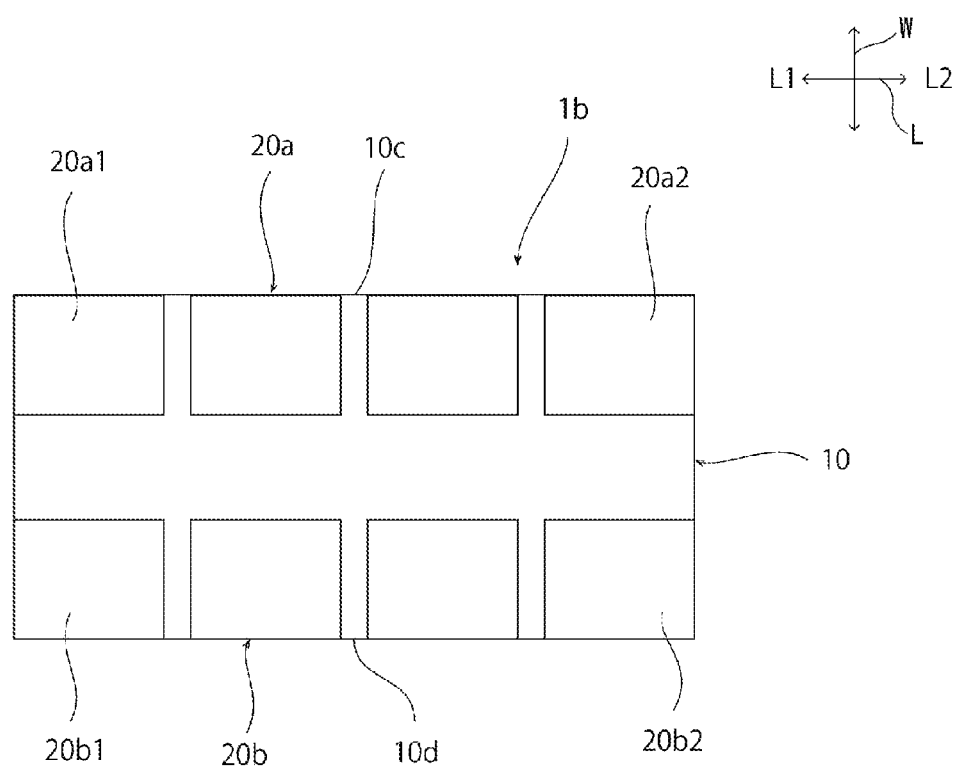
FIG. 9 is a schematic plan view of a capacitor according to a third preferred embodiment of the present invention.
Figure 10:
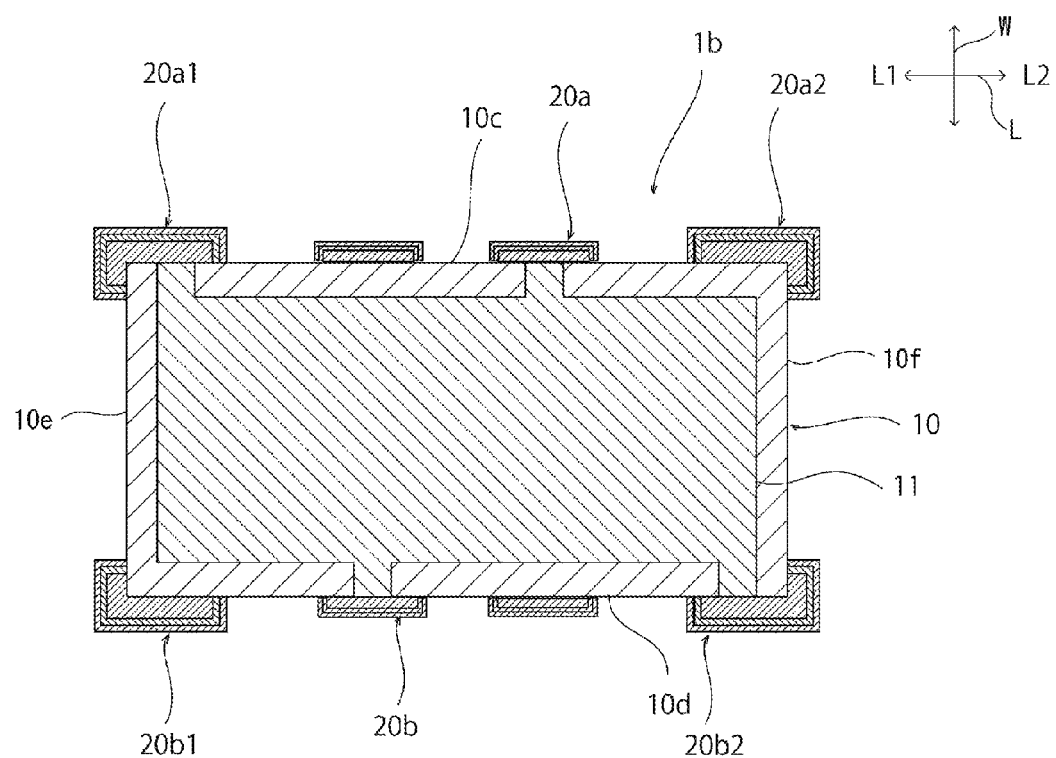
FIG. 10 is a schematic section view of the capacitor according to the third preferred embodiment of the present invention.
Figure 11:
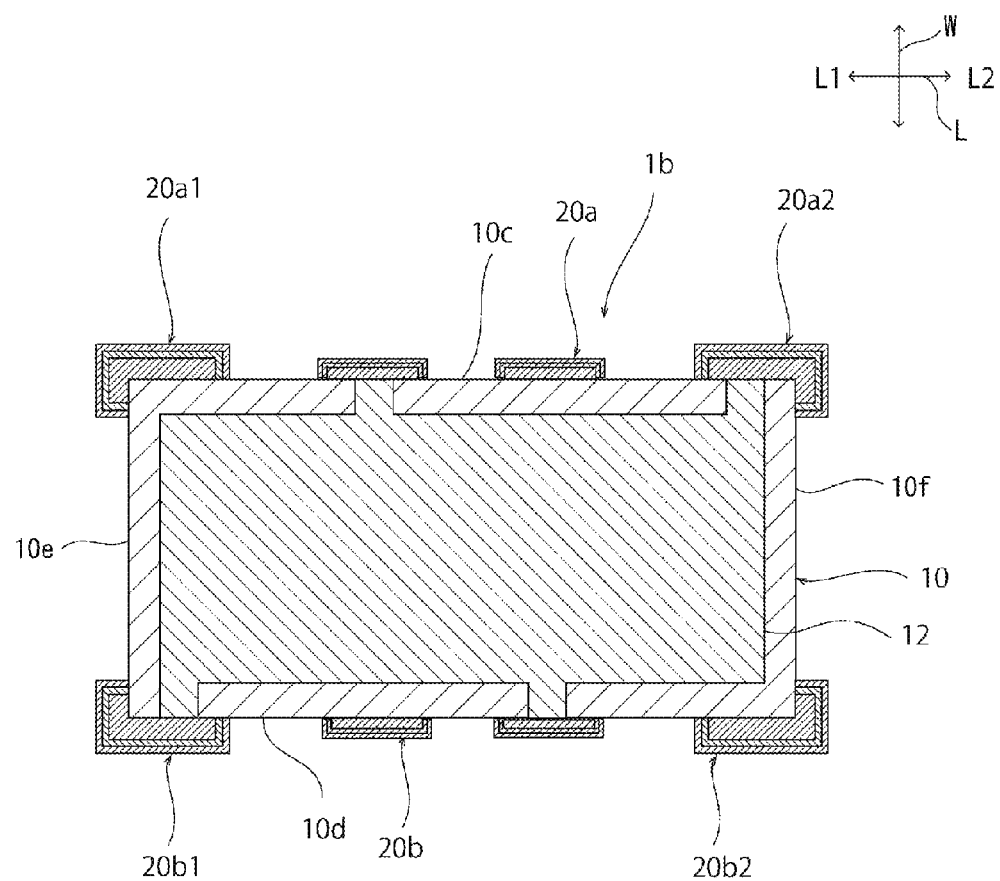
FIG. 11 is a schematic section view of the capacitor according to the third preferred embodiment of the present invention.

FIG. 9 is a schematic plan view of a capacitor according to a third preferred embodiment of the present invention. FIG. 10 is a schematic section view of the capacitor according to the third preferred embodiment. FIG. 11 is a schematic section view of the capacitor according to the third preferred embodiment.

As shown in FIG. 9, in a capacitor 1b according to the present preferred embodiment, four or more external electrodes 20a are disposed on the first lateral surface 10c, and four or more external electrodes 20b are disposed on the second lateral surface 10d. Among the plurality of external electrodes 20a, external electrodes 20a1, 20a2 located on the outer side in the length direction L are thicker than the other external electrodes 20a. Among the plurality of external electrodes 20b, external electrodes 20b1, 20b2 located on the outer side in the length direction L are thicker than the other external electrodes 20b.

Also, one of the external electrode 20a1 located closest to the L1 side in the length direction L on the first lateral surface 10c, and the external electrode 20b1 located closest to the L1 side in the length direction L on the second lateral surface 10d is connected with the first internal electrode 11, and the other of the external electrode 20a1 and the external electrode 20b1 is connected with the second internal electrode 12. In other words, the external electrode 20a1 located closest to the L1 side in the length direction L on the first lateral surface 10c, and the external electrode 20b1 located closest to the L1 side in the length direction L on the second lateral surface 10d are connected to the internal electrodes having different polarities.

One of the external electrode 20a2 located closest to the L2 side in the length direction L on the first lateral surface 10c, and the external electrode 20b2 located closest to the L2 side in the length direction L on the second lateral surface 10d is connected with the first internal electrode 11, and the other of the external electrode 20a2 and the external electrode 20b2 is connected with the second internal electrode 12. In other words, the external electrode 20a2 located closest to the L2 side in the length direction L on the first lateral surface 10c, and the external electrode 20b2 located closest to the L2 side in the length direction L on the second lateral surface 10d are connected to the internal electrodes having different polarities.

Therefore, likewise the capacitor 1 according to the first preferred embodiment, the capacitor 1b according to the present preferred embodiment also has excellent reliability, and has excellent self-alignability. Furthermore, the capacitor 1b has a low ESL. In other words, in a capacitor according to a preferred embodiment of the present invention, four or more external electrodes may be provided on each of the first and the second lateral surfaces.

Modified Example

In the above preferred embodiments, examples where all of the first and the second internal electrodes 11, 12 are alternately disposed in the laminating direction T have been described. The present invention is not limited to this configuration. For example, an electronic component according to a preferred embodiment of the present invention may include the first internal electrodes that are sequentially disposed in the laminating direction T, and the second internal electrodes that are sequentially disposed in the laminating direction T. In the present invention, the arrangement or structure of the first and the second internal electrodes in the laminating direction T is not particularly limited as long as at least one set of the first and the second internal electrodes that are opposite in the laminating direction T exists. For example, a first internal electrode laminated portion including three or more first internal electrodes that are sequentially disposed in the laminating direction T, and a second internal electrode laminated portion including three or more second internal electrodes that are sequentially disposed in the laminating direction T may be provided alternately in the laminating direction T. In this configuration, the first internal electrodes are located on both sides in the laminating direction T in the first internal electrode laminated portion, and the second internal electrodes are located on both sides in the laminating direction T in the second internal electrode laminated portion, and there are the first internal electrodes that substantially do not contribute to the formation of the capacitance, and there are the second internal electrodes that substantially do not contribute to the formation of the capacitance. Therefore, it is possible to decrease the electrostatic capacitance of the capacitor without reducing the number of the laminated internal electrodes. Accordingly, it is possible to realize a capacitor having a small electrostatic capacitance and high strength.

In an electronic component according to a preferred embodiment of the present invention, the value obtained by dividing the distance between the first internal electrode laminated portions that are adjacent to each other in the laminating direction by the sum of the thickness of the second internal electrode and the distance between the second internal electrodes that are adjacent to each other in the laminating direction ((distance between the first internal electrode laminated portions adjacent to each other in the laminating direction)/{(thickness of the second internal electrode)+(distance between the second internal electrodes adjacent to each other in the laminating direction)}) is preferably 25 or less, more preferably 8 or less, for example. In an electronic component according to a preferred embodiment of the present invention, the value obtained by dividing the distance between the second internal electrode laminated portions that are adjacent to each other in the laminating direction by the sum of the thickness of the first internal electrode and the distance between the first internal electrodes that are adjacent to each other in the laminating direction ((distance between the second internal electrode laminated portions adjacent to each other in the laminating direction)/{(thickness of the first internal electrode)+(distance between the first internal electrodes adjacent to each other in the laminating direction)}) is preferably 25 or less, more preferably 8 or less, for example. In this case, it is possible to significantly reduce or prevent the occurrence of a structural defect inside the electronic component.

In an electronic component according to a preferred embodiment of the present invention, each of the distance between the first internal electrode laminated portions that are adjacent to each other in the laminating direction, and the distance between the second internal electrode laminated portions that are adjacent to each other in the laminating direction is preferably about 31 μm or less, more preferably about 26 μm or less, further preferably about 18 μm or less, for example. In this case, it is possible to significantly reduce or prevent the occurrence of a structural defect inside the electronic component.

In an electronic component according to a preferred embodiment of the present invention, the electric component body may include an alternate laminated portion in which the first internal electrode and the second internal electrode are laminated alternately in the laminating direction. The alternate laminated portion does not include the portion where the first internal electrode and the second internal electrode are laminated while they are adjacent to each other in the laminating direction, that is formed by laminating the first internal electrode laminated portion and the second internal electrode laminated portion while they are adjacent to each other in the laminating direction.

In an electronic component according to a preferred embodiment of the present invention, the external electrode to which the internal electrode located closest to the first principal surface side in the electronic component body is connected may be different from the external electrode to which the internal electrode adjacent in the laminating direction is connected. In this case, a capacitance is generated between the internal electrode located closest to the first principal surface side in the capacitor body, and the internal electrode adjacent in the laminating direction. When the electronic component is mounted in such a manner that the first principal surface side is the mounting surface, it is possible to decrease the equivalent series inductance (ESL) of the electronic component.

Also in an electronic component according to a preferred embodiment of the present invention, the external electrode to which the internal electrode located closest to the second principal surface side in the electronic component body is connected may be different from the external electrode to which the internal electrode adjacent in the laminating direction is connected. In this case, a capacitance is generated between the internal electrode located closest to the second principal surface side in the capacitor body, and the internal electrode adjacent in the laminating direction. When the electronic component is mounted in such a manner that the second principal surface side is the mounting surface, it is possible to decrease the equivalent series inductance (ESL) of the electronic component.

Also in an electronic component according to a preferred embodiment of the present invention, the electronic component body may include a portion where the first internal electrode laminated portions and the second internal electrode laminated portions are alternately laminated in a total of eleven or more layers.

Hereinafter, preferred embodiments of the present invention will be described based on specific examples, however, it is to be noted that the present invention will not be limited in any way by the following examples, and can be practiced with an appropriate modification without departing from the scope of the present invention.

Example 1

A capacitor having substantially the same configuration as that of the capacitor 1a according to the second preferred embodiment of the present invention was prepared in the following conditions.

Main ingredients of the capacitor body: barium titanate to which Mg, V, Dy, and Si are added Thickness of the ceramic portion: 0.7 μm in average
Distance between the internal electrode located closest to the principal surface side and the principal surface: 35 μm in average Length dimension of the capacitor body: 1.14 mm
Width dimension of the capacitor body: 0.57 mm
Height dimension of the capacitor body: 0.37 mm
Number of the internal electrodes: 250
Thickness of the internal electrode: 0.5 μm in average
Distance between the portion where the first internal electrode and the second internal electrode are opposite to each other, and the end surface: 50 μm in average
Firing temperature: 1200° C.
Baking temperature: 920° C.
Configuration of the external electrode: a laminate in which the fired electrode layer, the Ni plating layer, and the Sn plating layer are laminated from the side of the capacitor body
Thickness of the external electrode located on the outermost side in the length direction L (T1): 40 μm
Thickness of the external electrode other than the external electrode located on the outermost side in the length direction L (T2): 28 μm
Difference between the thickness of the external electrode located on the outermost side in the length direction L and the thickness of the external electrode other than the external electrode located on the outermost side in the length direction L (S): 12 μm
Thickness of the fired electrode layer of the external electrode located on the outermost side in the length direction L: 32 μm
Thickness of the Ni plating layer of the external electrode located on the outermost side in the length direction L: 4 μm
Thickness of the Sn plating layer of the external electrode located on the outermost side in the length direction L: 4 μm
Thickness of the fired electrode layer of the external electrode other than the external electrode located on the outermost side in the length direction L: 20 μm
Thickness of the Ni plating layer of the external electrode other than the external electrode located on the outermost side in the length direction L: 4 μm
Thickness of the Sn plating layer of the external electrode other than the external electrode located on the outermost side in the length direction L: 4 μm Example 2

A capacitor was prepared in the same manner as in Example 1 except that the thickness of the external electrode located on the outermost side in the length direction L (T1) was 33 μm, the thickness of the external electrode other than the external electrode located on the outermost side in the length direction L (T2) was 28 μm, the thickness of the fired electrode layer of the external electrode located on the outermost side in the length direction L was 25 μm, the thickness of the fired electrode layer of the external electrode other than the external electrode located on the outermost side in the length direction L was 20 μm, and S was 5 μm.

Example 3

A capacitor was prepared in the same manner as in Example 1 except that the thickness of the external electrode located on the outermost side in the length direction L (T1) was 30 μm, the thickness of the external electrode other than the external electrode located on the outermost side in the length direction L (T2) was 28 μm, the thickness of the fired electrode layer of the external electrode located on the outermost side in the length direction L was 22 μm, the thickness of the fired electrode layer of the external electrode other than the external electrode located on the outermost side in the length direction L was 20 μm, and S was 2 μm.

Comparative Example 1

A capacitor was prepared in the same manner as in Example 1 except that the thickness of the external electrode located on the outermost side in the length direction L (T1) was 26 μm, the thickness of the external electrode other than the external electrode located on the outermost side in the length direction L (T2) was 28 μm, the thickness of the fired electrode layer of the external electrode located on the outermost side in the length direction L was 18 μm, the thickness of the fired electrode layer of the external electrode other than the external electrode located on the outermost side in the length direction L was 20 μm, and S was −2 μm.

Comparative Example 2

A capacitor was prepared in the same manner as in Example 1 except that the thickness of the external electrode located on the outermost side in the length direction L (T1) was 23 μm, the thickness of the external electrode other than the external electrode located on the outermost side in the length direction L (T2) was 28 μm, the thickness of the fired electrode layer of the external electrode located on the outermost side in the length direction L was 15 μm, the thickness of the fired electrode layer of the external electrode other than the external electrode located on the outermost side in the length direction L was 20 μm, and S was −5 μm.

Comparative Example 3

A capacitor was prepared in the same manner as in Example 1 except that the thickness of the external electrode located on the outermost side in the length direction L (T1) was 19 μm, the thickness of the external electrode other than the external electrode located on the outermost side in the length direction L (T2) was 28 μm, the thickness of the fired electrode layer of the external electrode located on the outermost side in the length direction L was 11 μm, the thickness of the fired electrode layer of the external electrode other than the external electrode located on the outermost side in the length direction L was 20 μm, and S was −9 μm.

Comparative Example 4

Figure 12:
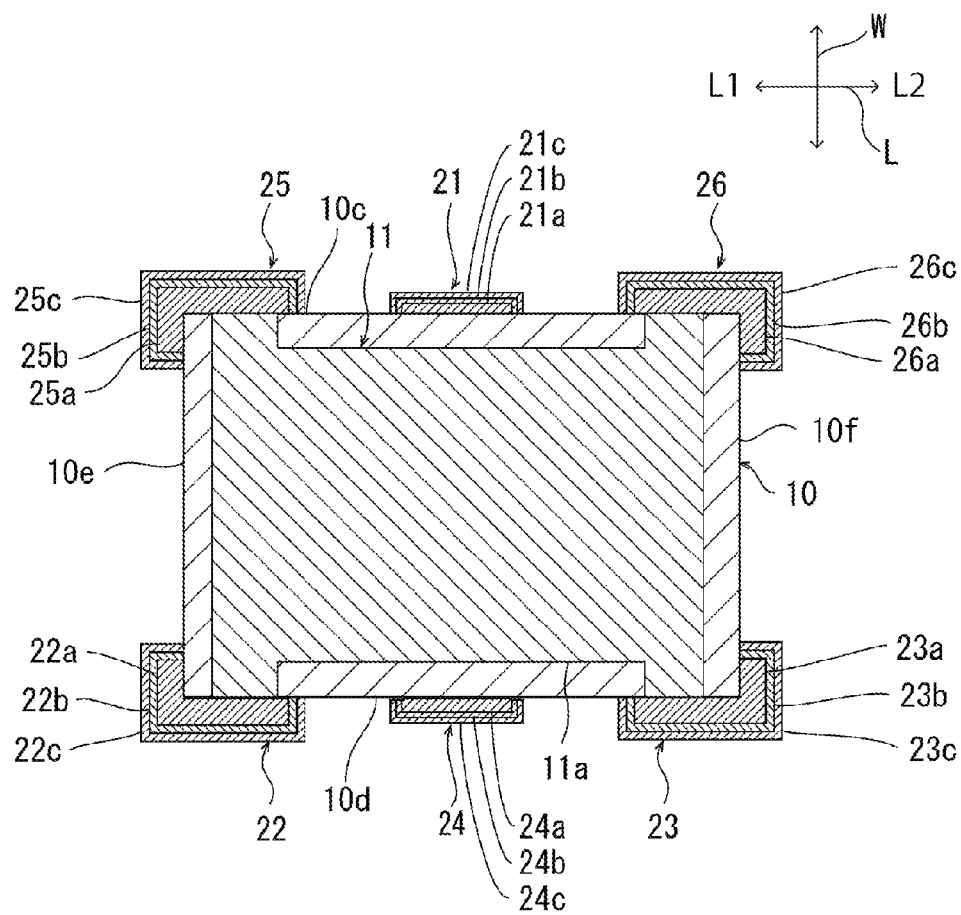
FIG. 12 is a schematic section view showing a first internal electrode of a capacitor prepared in Comparative Example 4.
Figure 13:
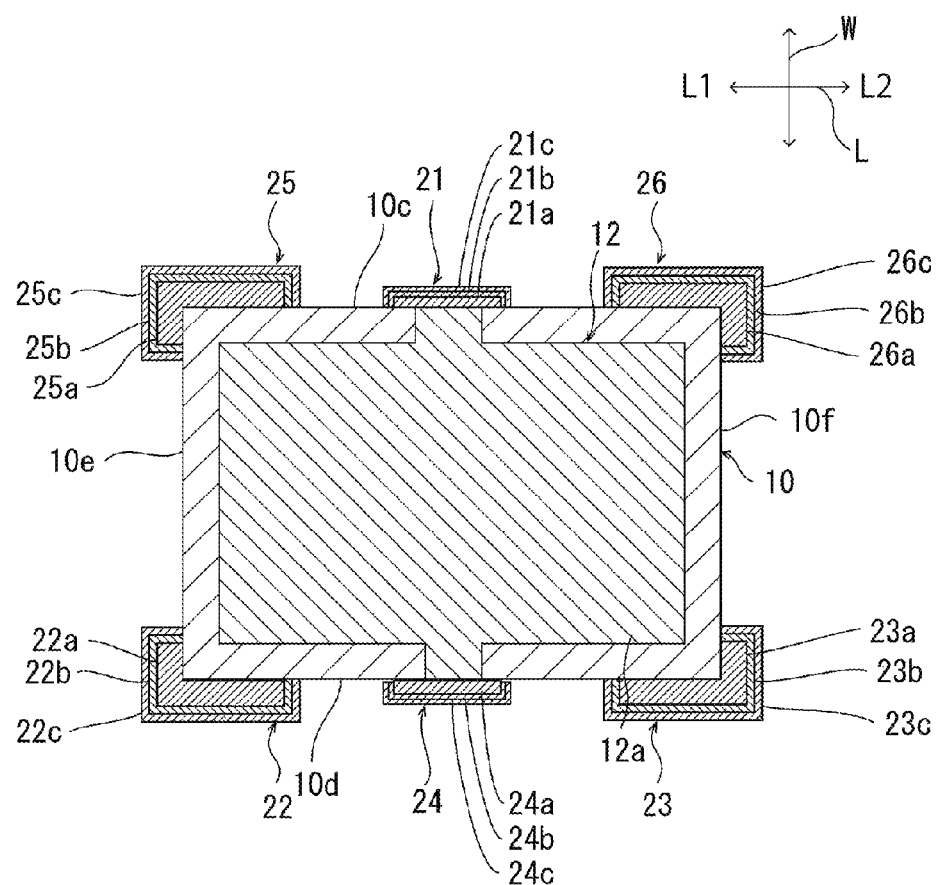
FIG. 13 is a schematic section view showing a second internal electrode of the capacitor prepared in Comparative Example 4.

The shape of the first internal electrode 11 was the shape shown in FIG. 12, and the shape of the second internal electrode 12 was the shape shown in FIG. 13. A capacitor was prepared in the same manner as in Example 1 except that the thickness of the external electrode located on the outermost side in the length direction L (T1) was 29 μm, the thickness of the external electrode other than the external electrode located on the outermost side in the length direction L (T2) was 28 μm, the thickness of the fired electrode layer of the external electrode located on the outermost side in the length direction L was 21 μm, the thickness of the fired electrode layer of the external electrode other than the external electrode located on the outermost side in the length direction L was 20 μm, and S was 1 μm.

Comparative Example 5

A capacitor was prepared in the same manner as in Comparative Example 4 except that the thickness of the external electrode located on the outermost side in the length direction L (T1) was 26 μm, the thickness of the external electrode other than the external electrode located on the outermost side in the length direction L (T2) was 28 μm, the thickness of the fired electrode layer of the external electrode located on the outermost side in the length direction L was 18 μm, the thickness of the fired electrode layer of the external electrode other than the external electrode located on the outermost side in the length direction L was 20 μm, and S was −2 μm.

Comparative Example 6

A capacitor was prepared in the same manner as in Comparative Example 4 except that the thickness of the external electrode located on the outermost side in the length direction L (T1) was 23 μm, the thickness of the external electrode other than the external electrode located on the outermost side in the length direction L (T2) was 28 μm, the thickness of the fired electrode layer of the external electrode located on the outermost side in the length direction L was 15 μm, the thickness of the fired electrode layer of the external electrode other than the external electrode located on the outermost side in the length direction L was 20 μm, and S was −5 μm.

Comparative Example 7

A capacitor was prepared in the same manner as in Comparative Example 4 except that the thickness of the external electrode located on the outermost side in the length direction L (T1) was 19 μm, the thickness of the external electrode other than the external electrode located on the outermost side in the length direction L (T2) was 28 μm, the thickness of the fired electrode layer of the external electrode located on the outermost side in the length direction L was 11 μm, the thickness of the fired electrode layer of the external electrode other than the external electrode located on the outermost side in the length direction L was 20 μm, and S was −9 μm.

Evaluation of Self-Alignability

On a glass epoxy substrate having the surface formed with a Cu pattern electrode, a lead-free solder paste (M705 available from Senju Metal Industry Co., Ltd.) was printed by screen printing using a metal mask of 80 μm thick, and then the capacitor prepared in each of the Examples and Comparative Examples was mounted in the following conditions so that the second principal surface was the mounting surface. Mounting of a capacitor was conducted for 5000 samples in each of Examples and Comparative Examples.

Heating Conditions:
Peak temperature: 250° C.
Heating atmosphere: ambient atmosphere
Temperature Profile:
Room temperature to 150° C. . . . 2° C./sec.
150° C. to 180° C. . . . 0.3° C./sec.
180° C. to 250° C. . . . 2° C./sec.
250° C. to room temperature . . . 2° C./sec.

The self-alignability was evaluated. The samples in which the length direction of the mounted capacitor was inclined by 45° or more with respect to the desired length direction, and the samples showing open failure were regarded as defective, and the number of the defective samples was counted.

Moisture Resistance Loading Test

A voltage of 4V was applied to the samples prepared in each of Examples and Comparative Examples for 1000 hours at conditions of 85° C., 85% RH. The samples showing a log IR of 6 or less were regarded as defective, and the number of the defective samples was counted.

Measurement of Thickness of Electrode

For each of the Examples and Comparative Examples, ten samples were prepared. The first principal surface of each of the samples was polished parallel with the first principal surface so that the height dimension was ½. Next, the maximum thickness in the width direction of each electrode was measured under a microscope (MM60 available from Nikon Corporation) at a magnification of 20 times. Then, an average value of the thicknesses of the external electrodes located on the outermost side in the length direction, and an average value of the thicknesses of the other external electrodes were calculated, and these values were regarded as the thickness of the external electrode located on the outermost side in the length direction, and the thickness of the other external electrode, respectively. Thicknesses of the fired electrode layer, and each plating layer were determined in the same manner.

S was determined by the following formula for each of ten samples, and an average value was calculated.

$$S=\{(\text{thickness of the fifth external electrode}-\text{thickness of the first external electrode})+(\text{thickness of the sixth external electrode}-\text{thickness of the first external electrode})+(\text{thickness of the second external electrode}-\text{thickness of the fourth external electrode})+(\text{thickness of the third external electrode}-\text{thickness of the fourth external electrode})\}/4$$

The results of the self-alignability evaluation and the moisture resistance loading test are shown in Table 1. In Table 1, the pattern of the internal electrode shown in FIG. 3 and FIG. 4 is indicated by "Pattern 1", and the pattern of the internal electrode shown in FIG. 12 and FIG. 13 is indicated by "Pattern 2".

TABLE 1

|  | S (μm) | Internal electrode | Self-alignability (number of defective samples/ total number of samples) | Moisture resistance loading test (number of defective samples/total number of samples) |
|---|---|---|---|---|
| Example 1 | 12 | Pattern 1 | 0/5000 | 0/5000 |
| Example 2 | 5 | Pattern 1 | 0/5000 | 0/5000 |
| Example 3 | 2 | Pattern 1 | 0/5000 | 2/5000 |
| Comparative Example 1 | −2 | Pattern 1 | 10/5000 | 14/5000 |
| Comparative Example 2 | −5 | Pattern 1 | 11/5000 | 20/5000 |
| Comparative Example 3 | −9 | Pattern 1 | 14/5000 | 40/5000 |
| Comparative Example 4 | 1 | Pattern 2 | 0/5000 | 50/5000 |
| Comparative Example 5 | −2 | Pattern 2 | 9/5000 | 98/5000 |
| Comparative Example 6 | −5 | Pattern 2 | 13/5000 | 245/5000 |
| Comparative Example 7 | −9 | Pattern 2 | 16/5000 | 356/5000 |

Example 4

A capacitor was prepared in the same manner as in Example 1 except that the external electrodes were formed so as not to cover ridges of the capacitor body as in the capacitor 1 according to the first preferred embodiment. In each of Example and Example 4, edge portions of prepared 1000 samples were measured, and samples containing a chip of 100 μm or more in size were regarded as defective, and the number of defective samples was counted. The result is shown in Table 2 below.

TABLE 2

|  | Number of defective samples/total number of samples |
|---|---|
| Example 1 | 0/1000 |
| Example 2 | 7/1000 |

Number of defective samples/total number of samples
Example 1: 0/1000
Example 2: 7/1000

Example 5

A capacitor was prepared in the same manner as in Example 3 except that the thickness of the fired electrode layer was 19 μm, and the thickness of the Ni plating layer was 6 μm in the second, third, fifth and sixth external electrodes. Also the capacitor prepared in Example 5 was subjected to the aforementioned self-alignability evaluation and the moisture resistance loading test. The result is shown in Table 3 below.

TABLE 3

|  | S (μm) | Internal electrode | Self-alignability (number of defective samples/ total number of samples) | Moisture resistance loading test (number of defective samples/total number of samples) |
|---|---|---|---|---|
| Example 5 | 2 | Pattern 1 | 0/5000 | 0/5000 |

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:

an electronic component body including first and second principal surfaces extending in a length direction and a width direction, first and second lateral surfaces extending in the length direction and a laminating direction, and first and second end surfaces extending in the width direction and the laminating direction;

a first internal electrode disposed inside the electronic component body;

a second internal electrode opposite to the first internal electrode in the laminating direction inside the electronic component body;

three or more external electrodes disposed on the first lateral surface, and connected with one of the first and second internal electrodes; and three or more external electrodes disposed on the second lateral surface, and connected with one of the first and second internal electrodes; wherein the first internal electrode is connected with the external electrode that is different from the external electrode to which the second internal electrode is connected;

either one of the internal electrode to which the external electrode located closest to the one side in the length direction among the three or more external electrodes disposed on the first lateral surface, and the internal electrode to which the external electrode located closest to the one side in the length direction among the three or more external electrodes disposed on the second lateral surface, is the first internal electrode, and the other is the second internal electrode;

either one of the internal electrode to which the external electrode located closest to the other side in the length direction among the three or more external electrodes disposed on the first lateral surface, and the internal electrode to which the external electrode located closest to the other side in the length direction among the three or more external electrodes disposed on the second lateral surface, is the first internal electrode, and the other is the second internal electrode;

on the first lateral surface, two external electrodes located on an outermost side in the length direction among the three or more external electrodes disposed on the first lateral surface is thicker than the other external electrode(s);

on the second lateral surface, two external electrodes located on the outermost side in the length direction among the three or more external electrodes disposed on the second lateral surface is thicker than the other external electrode(s).

2. The electronic component according to claim 1, wherein each of the three or more external electrodes disposed on the first lateral surface is opposite to either of the three or more external electrodes disposed on the second lateral surface in the width direction.

3. The electronic component according to claim 2, wherein in each of the three or more external electrodes disposed on the first lateral surface, one of the two external electrodes facing each other in the width direction is connected with the first internal electrode, and the other is connected with the second internal electrode.

4. The electronic component according to claim 1, wherein the plurality of external electrodes include:
   a first external electrode connected with the first internal electrode, and disposed on the first lateral surface;
   a second external electrode connected with the first internal electrode, and disposed closest to the one side in the length direction among the external electrodes disposed on the second lateral surface;
   a third external electrode connected with the first internal electrode, and disposed closest to the other side in the length direction among the external electrodes disposed on the second lateral surface;
   a fourth external electrode connected with the second internal electrode, and disposed on the second lateral surface; a fifth external electrode connected with the second internal electrode, and disposed closest to the one side in the length direction among the external electrodes disposed on the first lateral surface; and
   a sixth external electrode connected with the second internal electrode, and disposed closest to the other side in the length direction among the external electrodes disposed on the first lateral surface;
   on the first lateral surface, each of the fifth and sixth external electrodes is thicker than the first external electrode; and
   on the second lateral surface, each of the second and third external electrodes is thicker than the fourth external electrode.

5. The electronic component according to claim 1, wherein among the plurality of external electrodes, the external electrodes located on the outermost side in the length direction cover:
   a ridge defined by the first lateral surface and the first principal surface;
   a ridge defined by the second lateral surface and the first principal surface;
   a ridge defined by the first lateral surface and the second principal surface;
   a ridge defined by the second lateral surface and the second principal surface;
   a ridge defined by the first lateral surface and the first end surface;
   a ridge defined by the first lateral surface and the second end surface;
   a ridge defined by the second lateral surface and the first end surface;
   a ridge defined by the second lateral surface and the second end surface;
   a ridge defined by the first principal surface and the first end surface;
   a ridge defined by the first principal surface and the second end surface;
   a ridge defined by the second principal surface and the first end surface; and
   a ridge defined by the second principal surface and the second end surface.

6. The electronic component according to claim 1, wherein
   each of the plurality of external electrodes includes a base electrode layer disposed on the lateral surface, and a Ni plating layer disposed on the base electrode layer;
   on the first lateral surface, the Ni plating layers of the two external electrodes located on the outermost side in the length direction among the three or more external electrodes disposed on the first lateral surface are thicker than the Ni plating layer(s) of the other external electrode(s); and
   on the second lateral surface, the Ni plating layers of the two external electrodes located on the outermost side in the length direction among the three or more external electrodes disposed on the second lateral surface are thicker than the Ni plating layer(s) of the other external electrode(s).

7. The electronic component according to claim 1, wherein
   each of the plurality of external electrodes each includes a base electrode layer disposed on the lateral surface, and a Sn plating layer disposed on the base electrode layer;
   on the first lateral surface, the Sn plating layers of the two external electrodes located on the outermost side in the length direction among the three or more external electrodes disposed on the first lateral surface are thinner than the Sn plating layer(s) of the other external electrode(s); and
   on the second lateral surface, the Sn plating layers of the two external electrodes located on the outermost side in the length direction among the three or more external electrodes disposed on the second lateral surface are thinner than the Sn plating layer(s) of the other external electrode(s).

8. The electronic component according to claim 1, wherein
   the first internal electrode includes a first opposing portion opposite to the second internal electrode in the laminating direction;
   the second internal electrode includes a second opposing portion opposite to the first internal electrode in the laminating direction; and
   a distance in the length direction between the first and second opposing portions and the first or second end surface is about 10 µm or more and about 70 µm or less.

9. The electronic component according to claim 1, wherein
the first internal electrode includes a first opposing portion opposite to the second internal electrode in the laminating direction;
the second internal electrode includes a second opposing portion opposite to the first internal electrode in the laminating direction; and
a distance in the width direction between the first and second opposing portions and the first or second lateral surface is about 10 µm or more and about 70 µm or less.

10. The electronic component according to claim 1, wherein the electronic component is one of a capacitor, a piezoelectric component, a thermistor and an inductor.

11. The electronic component according to claim 1, wherein
the first internal electrode includes a first opposing portion opposite to the second internal electrode in the laminating direction;
the second internal electrode includes a second opposing portion opposite to the first internal electrode in the laminating direction; and
a distance in the length direction between the first and second opposing portions and the first or second end surface is about 55 µm or less.

12. The electronic component according to claim 1, wherein
the first internal electrode includes a first opposing portion opposite to the second internal electrode in the laminating direction;
the second internal electrode includes a second opposing portion opposite to the first internal electrode in the laminating direction; and
a distance in the length direction between the first and second opposing portions and the first or second end surface is about 40 µm or less.

13. The electronic component according to claim 1, wherein
the first internal electrode includes a first opposing portion opposite to the second internal electrode in the laminating direction;
the second internal electrode includes a second opposing portion opposite to the first internal electrode in the laminating direction; and
a distance in the width direction between the first and second opposing portions and the first or second end surface is about 55 µm or less.

14. The electronic component according to claim 1, wherein
the first internal electrode includes a first opposing portion opposite to the second internal electrode in the laminating direction;
the second internal electrode includes a second opposing portion opposite to the first internal electrode in the laminating direction; and
a distance in the width direction between the first and second opposing portions and the first or second end surface is about 40 µm or less.

15. The electronic component according to claim 1, wherein
the first internal electrode includes a first opposing portion opposite to the second internal electrode in the laminating direction;
the second internal electrode includes a second opposing portion opposite to the first internal electrode in the laminating direction; and
a distance in the length direction between the first and second opposing portions and the first or second end surface is about 55 µm or less.

16. The electronic component according to claim 1, wherein
the first internal electrode includes a first extended portion extended to the first lateral surface, a second extended portion extended to the second lateral surface, and a third extended portion connected to a first opposing portion opposite to the second internal electrode in the laminating direction.

17. The electronic component according to claim 16, wherein
the second internal electrode includes a fourth extended portion connected to a second opposing portion opposite to the first opposing portion in the laminating direction, a fifth extended portion extended to the second lateral surface, and a sixth extended portion extended to the first lateral surface and connected to the second opposing portion.

18. The electronic component according to claim 17, wherein each of the first, second, third, fourth, fifth, and sixth extended portions is rectangular or substantially rectangular.

19. The electronic component according to claim 17, wherein a width of each of the first, second, third, fourth, fifth, and sixth extended portions is about 80 µm or more and about 140 µm or less.

20. The electronic component according to claim 17, wherein each of the second, third, fifth, and sixth extended portions is not exposed on the first and second end surfaces of the capacitor body.

21. The electronic component according to claim 1, wherein a total of six of the external electrodes are provided on the capacitor body.

* * * * *